US011543890B2

(12) United States Patent
Wang

(10) Patent No.: US 11,543,890 B2
(45) Date of Patent: Jan. 3, 2023

(54) CUSTOM GESTURE COLLECTION AND RECOGNITION SYSTEM HAVING MACHINE LEARNING ACCELERATOR

(71) Applicant: KAIKUTEK INC., Taipei (TW)

(72) Inventor: Mike Chun-Hung Wang, Taipei (TW)

(73) Assignee: Kaikutek Inc., Taipei (TW)

( * ) Notice: Subject to any disclaimer, the term of this patent is extended or adjusted under 35 U.S.C. 154(b) by 162 days.

(21) Appl. No.: 17/208,162

(22) Filed: Mar. 22, 2021

(65) Prior Publication Data

US 2022/0300080 A1 Sep. 22, 2022

(51) Int. Cl.
*G06F 3/01* (2006.01)
*G06N 5/04* (2006.01)
*G06N 20/00* (2019.01)

(52) U.S. Cl.
CPC .............. *G06F 3/017* (2013.01); *G06N 5/04* (2013.01); *G06N 20/00* (2019.01)

(58) Field of Classification Search
None
See application file for complete search history.

(56) References Cited

U.S. PATENT DOCUMENTS

| 10,705,185 | B1 * | 7/2020 | Lien | .......... G01S 13/56 |
| 2009/0072912 | A1 * | 3/2009 | Kim | .......... H03L 7/193 |
| | | | | 455/86 |
| 2013/0194193 | A1 | 8/2013 | Kawalkar | |
| 2015/0106399 | A1 | 4/2015 | Hinckley | |
| 2016/0050676 | A1 * | 2/2016 | Sinnaduray | .......... H04L 5/0044 |
| | | | | 370/329 |
| 2019/0049558 | A1 * | 2/2019 | Yung | .......... G06F 3/017 |

FOREIGN PATENT DOCUMENTS

| TW | 201617787 A | 5/2016 |
| TW | 202009654 A | 3/2020 |
| TW | M595256 U | 5/2020 |

OTHER PUBLICATIONS

Communication From Taiwan Patent Office Regarding a Counterpart Foreign Application dated (Taiwan Year 111) Jan. 26, 2022.

* cited by examiner

*Primary Examiner* — Nicholas J Lee
(74) *Attorney, Agent, or Firm* — Rosenberg, Klein & Lee

(57) ABSTRACT

A custom gesture collection and recognition system having a machine learning accelerator includes a transmission unit, a first reception chain, a second reception chain, a customized gesture collection engine and a machine learning accelerator. The transmission unit transmits a transmission signal to detect a gesture. The first reception chain receives a first signal and generates first feature map data corresponding to the first signal. The second reception chain receives a second signal and generates second feature map data corresponding to the second signal. The first signal and the second signal are generated by the gesture reflecting the transmission signal. The customized gesture collection engine generates gesture data according to at least the first feature map data and the second feature map data. The machine learning accelerator performs machine learning with the gesture data. The accuracy and correctness of gesture recognition may be improved by means of machine learning.

15 Claims, 1 Drawing Sheet

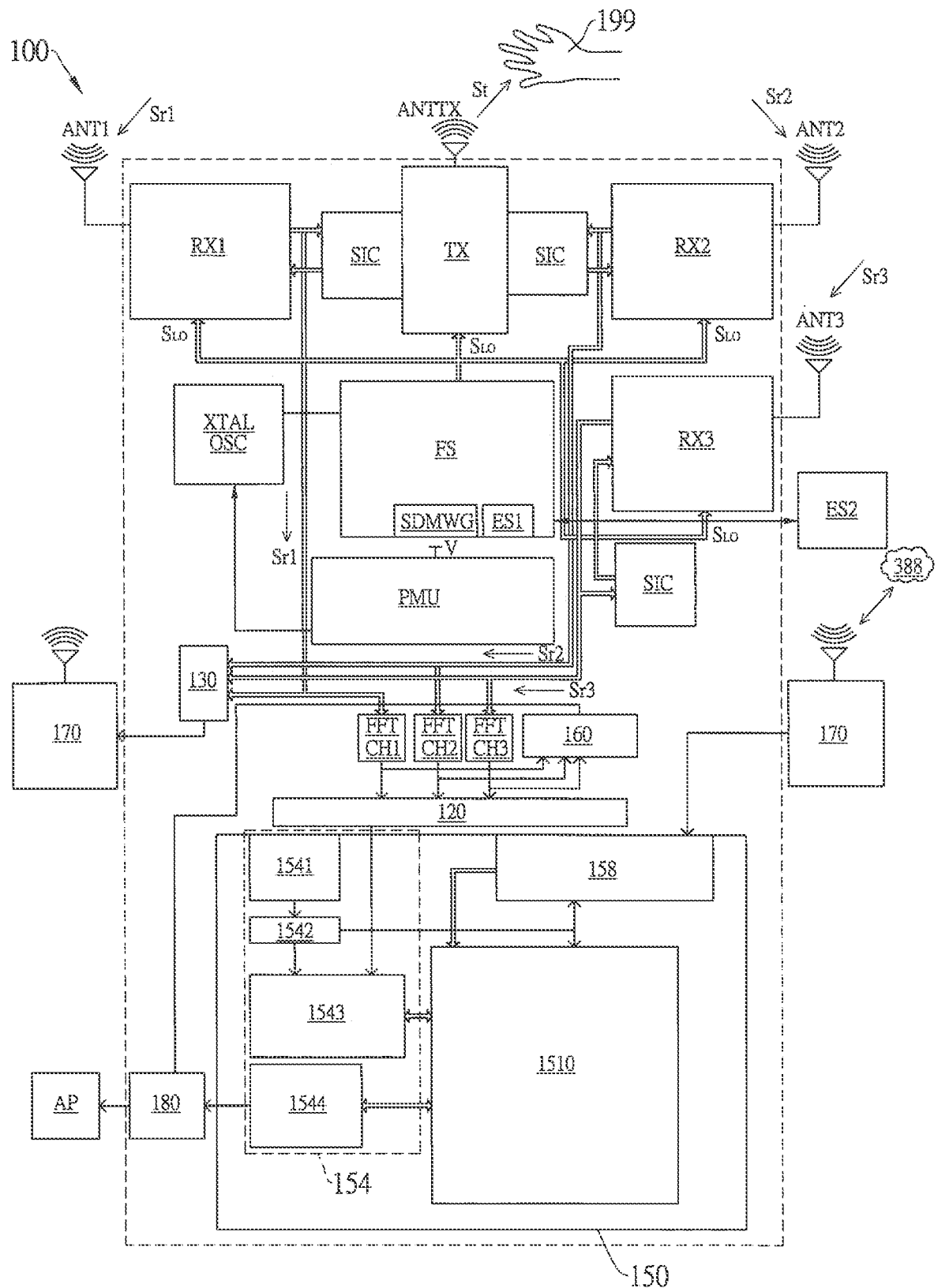

CUSTOM GESTURE COLLECTION AND RECOGNITION SYSTEM HAVING MACHINE LEARNING ACCELERATOR

BACKGROUND OF THE INVENTION

1. Field of the Invention

The disclosure relates to a gesture collection and recognition system, and more particularly to a custom gesture collection and recognition system having a machine learning accelerator.

2. Description of the Related Art

With the development of electronic product technology, communications between a user and a machine have become an increasingly important technical issue.

Common input methods include touching a touch screen, voice control, using a stylus, and so on. Although the above methods are usable, there are still many limitations.

For example, a user still needs to touch the device or make a sound as an input command. However, for the input command, the application also has a limitation on the distance. Moreover, the above approaches are not easy to be implemented for applications related to games or more complex controls.

In view of this, it has been proposed to perform control using gesture detection. However, it is often difficult to recognize gestures correctly. Furthermore, the gestures generated by each user are distinct, which are often not allowed to set customized gestures for a user. Therefore, the gestures are hard to be implemented as the input command for the machine.

SUMMARY OF THE INVENTION

In view of this, an embodiment provides a custom gesture collection and recognition system having a machine learning accelerator including a transmission unit, a first reception chain, a second reception chain, a third reception chain, a customized gesture collection engine and a machine learning accelerator. The transmission unit has a self-interference cancellation engine and is configured to transmit a transmission signal to detect a gesture. The first reception chain is configured to receive a first signal and generate first feature map data corresponding to the first signal, wherein the first signal is generated by the gesture reflecting the transmission signal. The second reception chain is configured to receive a second signal and generate second feature map data corresponding to the second signal. The second signal is generated by the gesture reflecting the transmission signal. The third reception chain is configured to receive a third signal and generate third feature map data corresponding to the third signal. The third signal is generated by the gesture reflecting the transmission signal. The customized gesture collection engine is configured to generate gesture data according to at least the first feature map data, the second feature map data, and the third feature map data. The customized gesture collection engine includes a first terminal coupled to the first reception chain and configured to receive the first feature map data, a second terminal coupled to the second reception chain and configured to receive the second feature map data, a third terminal coupled to the third reception chain and configured to receive the third feature map data, and an output terminal configured to output the gesture data corresponding to at least the first feature map data, the second feature map data, and the third feature map data. The machine learning accelerator is configured to perform machine learning with the gesture data. The machine learning accelerator comprises an input terminal coupled to the output terminal of the customized gesture collection engine and configured to receive the gesture data, wherein the first signal, the second signal, and the third signal are inputted to the self-interference cancellation engine.

These and other objectives of the present invention will no doubt become obvious to those of ordinary skill in the art after reading the following detailed description of the preferred embodiment that is illustrated in the various FIGURES and drawings.

BRIEF DESCRIPTION OF THE DRAWING

The FIGURE illustrates a custom gesture collection and recognition system having a machine learning accelerator according to an embodiment of the present invention.

DETAILED DESCRIPTION OF THE INVENTION

The FIGURE illustrates a custom gesture collection and recognition system having a machine learning accelerator 100 according to an embodiment. The custom gesture collection and recognition system having a machine learning accelerator 100 may include a transmission unit TX, a first reception chain RX1, a second reception chain RX2, a third reception chain RX3, a customized gesture collection engine 130, and a machine learning accelerator 150.

The transmission unit TX may be used to transmit a transmission signal St to detect a gesture 199. The first reception chain RX1 may be used to receive a first signal Sr1 and generate first feature map data Dfm1 corresponding to the first signal Sr1. The transmission signal St detects a variation of the gesture 199 and generates a reflection signal according to the variation. The first signal Sr1 may be generated by the gesture 199 reflecting the transmission signal St. The second reception chain RX2 may be used to receive a second signal Sr2 and generate second feature map data Dfm2 corresponding to the second signal Sr2. The second signal Sr2 may be generated by the gesture 199 reflecting the transmission signal St. The third reception chain RX3 may be used to receive a third signal Sr3 and generate third feature map data Dfm3 corresponding to the third signal Sr3. The third signal Sr3 may be generated by the gesture 199 reflecting the transmission signal St.

The transmission unit TX includes a self-interference cancellation (SIC) engine, which is implemented based on an analog vector modulator. An output signal generated by the SIC engine can automatically trace a time-varying self-interference signal via a least mean square algorithm. The first signal Sr1 received by the first reception chain RX1, the second signal Sr2 received by the second reception chain RX2, and the third signal Sr3 received by the third reception chain RX3 are inputted to the SIC engine of the transmission unit TX whereby the SIC engine of the transmission unit TX can detect the significant variation of a strong power for the first signal Sr1, the second signal Sr2, and the third signal Sr3. Consequently, the custom gesture collection and recognition system having a machine learning accelerator 100 has the effects on precise and extensive detection results of the gesture.

As shown in the FIGURE, according to an embodiment, the transmission unit TX may be coupled to an antenna ANTTX used to transmit the transmission signal St. The first reception chain RX1 may include but not limited to a first antenna ANT1, a first receiver RX1, a first signal processing engine SP1 and a first feature map generator FMG1. The first antenna ANT1 may be used to receive the first signal Sr1. The first receiver RX1 includes a first terminal, a second terminal, and an output terminal. The first terminal is coupled to the first antenna ANT1 and used to receive the first signal Sr1. The second terminal is coupled to the SIC engine of the transmission unit TX and used to receive the transmission signal St. The output terminal is used to output the first signal Sr1. The first signal processing engine SP1 may be used to generate first processed data Dp1 according to the first signal Sr1. The first signal processing engine SP1 may include an input terminal coupled to the output terminal of the first receiver RX1 and used to receive the first signal Sr1, and an output terminal used to output the first processed data Dp1. The first feature map generator FMG1 may be used to generate the first feature map data Dfm1 according to the first processed data Dp1. The first feature map generator FMG1 may include an input terminal coupled to the output terminal of the first signal processing engine SP1 and used to receive the first processed data Dp1, and an output terminal used to output the first feature map data Dfm1.

As shown in the FIGURE, according to an embodiment, the second reception chain RX2 may include but not limited to a second antenna ANT2, a second receiver RX2, a second signal processing engine SP2 and a second feature map generator FMG2. The second antenna ANT2 may be used to receive the second signal Sr2. The second receiver RX2 includes a first terminal, a second terminal, and an output terminal. The first terminal is coupled to the second antenna ANT2 and used to receive the second signal Sr2. The second terminal is coupled to the SIC engine of the transmission unit TX and used to receive the transmission signal St. The output terminal is used to output the second signal Sr2. The second signal processing engine SP2 may be used to generate second processed data Dp2 according to the second signal Sr2. The second signal processing engine SP2 may include an input terminal coupled to the output terminal of the second receiver RX2 and used to receive the second signal Sr2, and an output terminal used to output the second processed data Dp2. The second feature map generator FMG2 may be used to generate the second feature map data Dfm2 according to the second processed data Dp2. The second feature map generator FMG2 may include an input terminal coupled to the output terminal of the second signal processing engine SP2 and used to receive the second processed data Dp2, and an output terminal used to output the second feature map data Dfm2.

As shown in the FIGURE, according to an embodiment, the third reception chain RX3 may include but not limited to a third antenna ANT3, a third receiver RX3, a third signal processing engine SP3 and a third feature map generator FMG3. The third antenna ANT3 may be used to receive the third signal Sr3. The third receiver RX3 includes a first terminal, a second terminal, and an output terminal. The first terminal is coupled to the third antenna ANT3 and used to receive the third signal Sr3. The second terminal is coupled to the SIC engine of the transmission unit TX and used to receive the transmission signal St. The output terminal is used to output the third signal Sr3. The third signal processing engine SP3 may be used to generate third processed data Dp3 according to the third signal Sr3. The third signal processing engine SP3 may include an input terminal coupled to the output terminal of the third receiver RX3 and used to receive the third signal Sr3, and an output terminal used to output the third processed data Dp3. The third feature map generator FMG3 may be used to generate the third feature map data Dfm3 according to the third processed data Dp3. The third feature map generator FMG3 may include an input terminal coupled to the output terminal of the third signal processing engine SP3 and used to receive the third processed data Dp3, and an output terminal used to output the third feature map data Dfm3.

The customized gesture collection engine 130 includes a first terminal, a second terminal, a third terminal and an output terminal. The first terminal is coupled to the first receiver RX1 and used to receive the first feature map data Dfm1. The second terminal is coupled to the second receiver RX2 and used to receive the second feature map data Dfm2. The third terminal is coupled to the third receiver RX3 and used to receive the third feature map data Dfm3. The output terminal is used to output gesture data Dg corresponding to at least the first feature map data Dfm1, the second feature map data Dfm2 and the third feature map data Dfm3. Moreover, the customized gesture collection engine 130 is respectively connected to the first feature map generator FMG1 of the first receiver RX1, the second feature map generator FMG2 of the second receiver RX2, and the third feature map generator FMG3 of the third receiver RX3 to receive the first feature map data Dfm1, the second feature map data Dfm2, and the third feature map data Dfm3. The customized gesture collection engine 130 stores the predefined gesture data Dg according to the at least first feature map data Dfm1, the at least second feature map data Dfm2, and the at least third feature map data Dfm3. A case in point is that the first feature map data Dfm1, the second feature map data Dfm2, and the third feature map data Dfm3 include a victor gesture displayed by a user. The victor gesture is to show an index finger and a middle finger of a hand. The gesture data Dg generates corresponding data according to the victor gesture. The corresponding data is stored in the customized gesture collection engine 130.

The custom gesture collection and recognition system having a machine learning accelerator 100 may further include a three dimensional coordinate trace engine 160, connected to the output terminal of the customized gesture collection engine 130 to receive the first feature map data Dfm1, the second feature map data Dfm2, and the third feature map data Dfm3. The three dimensional coordinate trace engine 160 calculates (transforms) the space coordinates for the first feature map data Dfm1, the second feature map data Dfm2, and the third feature map data Dfm3 via a function of a coordinate transformation. The calculation result and the gesture data Dg stored in the customized gesture collection engine 130 are transmitted to the first micro controller unit 180 to compare the coordinate.

The custom gesture collection and recognition system having a machine learning accelerator 100 may further include a first fast Fourier transform channel FFT CH1 (FFT channel 1), a second fast Fourier transform channel FFT CH2 (FFT channel 2), and a third fast Fourier transform channel FFT CH3 (FFT channel 3), connected between the customized gesture collection engine 130 and the three dimensional coordinate trace engine 160 to transform the first feature map data Dfm1, the second feature map data Dfm2, and the third feature map data Dfm3 received by the customized gesture collection engine 130 to the three dimensional coordinate trace engine 160.

The machine learning accelerator 150 may be used to perform machine learning with the gesture data Dg. The machine learning accelerator 150 may include an input terminal coupled to the output terminal of the customized gesture collection engine 130 and used to receive the gesture data Dg.

As shown in the FIGURE, according to an embodiment, the custom gesture collection and recognition system having a machine learning accelerator 100 may further include a frequency synthesizer FS used to provide a reference oscillation signal $S_{LO}$. In this embodiment, the transmission unit TX may include an input terminal, the first receiver RX1 may further comprise a second terminal, the second receiver RX2 may further comprise a second terminal, and the third receiver RX3 may further comprise a second terminal. The frequency synthesizer FS may include a first terminal coupled to the second terminal of the first receiver RX1 for outputting the reference oscillation signal $S_{LO}$ to the first receiver RX1, a second terminal coupled to the second terminal of the second receiver RX2 for outputting the reference oscillation signal $S_{LO}$ to the second receiver RX2, a third terminal coupled to the input terminal of the transmission unit TX for outputting the reference oscillation signal $S_{LO}$ to the transmission unit TX, and a fourth terminal coupled to the second terminal of the third receiver RX3 for outputting the reference oscillation signal $S_{LO}$ to the third receiver RX3. According to an embodiment, the transmission unit TX may adjust the transmission signal St according to the reference oscillation signal $S_{LO}$, the first reception chain R1 may adjust the first signal Sr1 according to the reference oscillation signal $S_{LO}$, the second reception chain R2 may adjust the second signal Sr2 according to the reference oscillation signal $S_{LO}$, and the third reception chain R3 may adjust the third signal Sr3 according to the reference oscillation signal $S_{LO}$.

According to an embodiment, as shown in the FIGURE, the frequency synthesizer FS may further include a Sigma-Delta modulator waveform generator SDMWG and an event synthesizer ES. The Sigma-Delta modulator waveform generator SDMWG may be used to modulate a waveform and the reference oscillation signal $S_{LO}$. The event synthesizer ES enhances the resolution of the waveform by adding the amount of the antenna. In an embodiment, the event synthesizer ES includes a main event synthesizer ES1 and a subordinate event synthesizer ES2. The main event synthesizer ES1 is disposed in the event synthesizer ES. The subordinate event synthesizer ES2 is disposed in the outside of the event synthesizer ES. The main event synthesizer ES1 is connected to the subordinate event synthesizer ES2.

As shown in the FIGURE, according to an embodiment, the custom gesture collection and recognition system having a machine learning accelerator 100 may further include a crystal oscillator XTAL OSC, which is utilized to generated a stable reference frequency of the frequency synthesizer FS.

According to an embodiment, the custom gesture collection and recognition system having a machine learning accelerator 100 may further include a phase extractor 120 used to analyze phases of the first signal Sr1 outputted by the first fast Fourier transform channel FFT CHL the second signal Sr2 outputted by the second fast Fourier transform channel FFT CH2, and the third signal Sr3 outputted by the third fast Fourier transform channel FFT CH3. The phase extractor 120 outputs the analyzed result to a machine learning hardware accelerator scheduler 154 of a machine learning accelerator 150 to learn a gesture identification. In an embodiment, the phase extractor 120 is employed to detect the variation of the gesture 199 in space. The phase extractor 120 includes a range extractor engine, a Doppler extractor, and a phase difference extractor and so on.

According to an embodiment, as shown in the FIGURE, the machine learning accelerator 150 may further include a weight modulating engine 158 and an array processor 1510. The weight modulating engine 158 may be used to store and decompress a compressed weight Wc to generate a decompressed weight Wd. The array processor 1510 may be linked to the weight modulating engine 158 and used to receive the decompressed weight Wd and the gesture data Dg, and recognize the gesture 199 using a recognition algorithm according to the decompressed weight Wd and the gesture data Dg. Because the compressed weight Wc and the decompressed weight Wd have been stored in the weight modulating engine 158, the required storage space may be decreased.

According to an embodiment, as shown in the FIGURE, the machine learning accelerator 150 may further include a machine learning hardware acceleration scheduler 154 linked to the phase extractor 120, the first micro controller unit 180 and the array processor 1510, used to act as an interface between the array processor 1510 and the first micro controller unit 180, and receiving the first signal Sr1, the second signal Sr2, and the third signal Sr3 analyzed by the phase extractor 120. The machine learning hardware acceleration scheduler 154 includes a second micro controller unit 1541, a direct memory access controller 1542, a memory 1543, and a softmax activation function module 1544. The second micro controller unit 1541 controls the weight modulating engine 158, the array processor 1510, and the memory 1543 to receive and output signals via the direct memory access controller 1542. In an embodiment, the second micro controller unit 1541 is a neural network. The second micro controller unit 1541 operates according to the parameter received by the first micro controller unit 180, generates a sequence of controlling signals to the direct memory access controller 1542, and controls the weight modulating engine 158 and the memory 1543 to receive and output signals. The array processor 1510 utilizes the array data of the weight modulating engine 158 and the memory 1543 to operate, and the result is stored in the memory 1543. The softmax activation function module 1544 is applied to input and output signals. In details, the result generated by the array processor 1510, such as the array data of the array processor 1510, is transmitted and outputted to the first micro controller unit 180 and an application to operate via the softmax activation function module 1544. The first micro controller unit 180 may be applied to operate a related program such as a mobile app for gesture recognition. The first micro controller unit 180 may also be used to send data to a cloud server 388 for weight training.

According to an embodiment, as shown in the FIGURE, the gesture data Dg may be transmitted to the cloud server 388 to be trained by the cloud server 388 for generating an updated weight Wu. The updated weight Wu may be transmitted to the weight modulating engine 158 to update the weight Wc stored in the weight modulating engine 158. Then, the machine learning accelerator 150 may use the gesture data Dg and the updated weight Wu stored in the weight modulating engine 158 to perform calculations for gesture recognition. By means of the trainings performed on the cloud server 388, the weights used by the machine learning accelerator 150 may be timely updated and adjusted, and the accuracy and correctness of gesture recognition may be improved. Furthermore, customized gesture setting and training may be realized.

According to an embodiment, as shown in the FIGURE, the custom gesture collection and recognition system having a machine learning accelerator 100 may further include an external host 170, being capable of wireless connections, and disposed between the cloud server 388 and the machine learning accelerator 150. The gesture data Dg can be transmitted to the cloud server 388 via the external host 170. The gesture data Dg is trained by the cloud server 388 so as to generate the updated weight Wu. The external host 170 can be connected to the customized gesture collection engine 130 to store and transmit the first feature map data Dfm1, the second feature map data Dfm2, and the third feature map data Dfm3 to the cloud server 388 for being trained.

According to an embodiment, as shown in the FIGURE, the custom gesture collection and recognition system having a machine learning accelerator 100 may further include an application AP connected to the first micro controller unit 180. The application AP can follow the position of the gesture 199 according to the result of the coordinate comparison calculated by the first micro controller unit 180. In addition, the present invention combines the technology of the self-interference cancellation engine to achieve the fine effect of gesture detection. For instance, the application can recognize the calligraphic font, the Chinese font, written in the air by the user via the optical identification technology. Furthermore, the present can integrate (install) the gesture recognition functions of the whole system, the finger, the hand, and the palm in the wearable device, the intelligent device, the laptop, the intelligent appliance, the household appliance, the electrical appliance, the humanity interface, or the human machine interface, wherein the wearable device includes a true wireless stereo. For instance, the true wireless stereo includes an earphone and an ear bar. Hence, the gesture recognition functions can be utilized as the inputted commands to control the aforementioned devices. Besides, the gesture recognition function combined with the object track function (the present invention) can be applied to the exercise game, the interaction game, and the Chinese font inputting device. In one aspect, when the gesture recognition function and the object track function are applied to the exercise game and the interaction game, the inputted commands to control the exercise game and the interaction game are generated via recognizing and tracing the gesture of the user. In another aspect, when the gesture recognition function and the object track function are applied to the Chinese font inputting device, the Chinese character is generated and identified via recognizing and tracing the gesture of the user.

According to an embodiment, the custom gesture collection and recognition system having a machine learning accelerator 100 may further include a power management unit PMU for receiving a voltage V. The functional blocks described above and shown in the FIGURE may be implemented using hardware, software and/or firmware. The functional blocks described above may be formed separately or be combined with one another. The terminals of the functional blocks used for signal/data transmission shown in the FIGURE are merely examples instead of limiting the disclosure, and reasonable adjustment and modification are still in the scope of embodiments.

According to an embodiment, by means of the custom gesture collection and recognition system having a machine learning accelerator 100 described above, an anti-jamming/ collision avoidance system may be realized. According to an embodiment, the custom gesture collection and recognition system having a machine learning accelerator 100 may include an FMCW (Frequency modulated continuous waveform) radar system for hand/finger gesture recognition application using a hardware DNN (Deep Neural Network) accelerator (e.g. the machine learning accelerator 150) and a customizable gesture training platform. The custom gesture collection and recognition system having a machine learning accelerator 100 may process signals of high frequency such as 60 GHz. The custom gesture collection and recognition system having a machine learning accelerator 100 may be implemented as an SoC (System on Chip), a chipset, or an integrated device having at least a chip and other elements which may be connected via a circuit board.

For example, anti-jamming/collision avoidance may be achieved by turning on the two receivers RX1 and RX2 to sweep a frequency spectrum first. For example, the swept frequency spectrum may be the entire 57-67 GHz spectrum. The custom gesture collection and recognition system having a machine learning accelerator 100 may skip the portions of spectrum occupied by other users/devices so as to avoid collision. This anti-jamming/collision avoidance algorithm may be done on a Frame to Frame basis. The entire algorithm for gesture recognition may be based on Machine Learning and Deep Neural Network (ML and DNN). The ML/DNN related circuit such as the machine learning accelerator 150 may receive outputs from the feature map generators FMG1 and FMG2 and form "frames" for gesture recognition. Because of the computational workload and real time, low latency requirement, the recognition algorithm is realized with a special hardware array processor (such as the array processor 1510). A dedicated Scheduler (e.g. a machine learning hardware accelerator scheduler 154) may act as an interface between the array processor 1510 and the first micro controller unit 180. Furthermore, since special compression algorithm may be applied to reduce memory requirement for weights, a special decompression engine (e.g. the weight modulating engine 158) may be used to process the compressed weight (e.g. the compressed weight Wc) first before feeding to the accelerator 150. In the custom gesture collection and recognition system having a machine learning accelerator 100, the machine learning accelerator 150 may be used for gesture detection recognition dedicatedly and may be disposed in the proposed system locally according to an embodiment. The custom gesture collection and recognition system having a machine learning accelerator 100 may be a stand-alone system which is able to operate for gesture recognition independently. Hence, it is more convenient to integrate the proposed system into another device (e.g. a mobile phone, a tablet, a computer, etc.), and engineering efficiency may also be improved. For example, the time and/or power consumption required for gesture recognition may be reduced. The machine learning accelerator (e.g. 150) may be used to reduce the required gesture processing time at the custom gesture collection and recognition system having a machine learning accelerator 100, and the weights used by the machine learning accelerator (e.g. 150) may be obtained from gesture training. Gesture training may be performed by a remote ML server such as the cloud server 388.

As a typical application scenario, a fixed number of gestures may be collected and used for training. Gesture recognition using a plurality of weights may be improved by performing training using a set of collected gestures. For example, a single gesture may be performed by one thousand persons so as to generate one thousand samples, and these one thousand samples may then be processed by a cloud ML server (e.g. the cloud server 388). The cloud ML server may perform gesture training using these samples so as to obtain a corresponding result. The result may be a set of weights used in the gesture inference process. Therefore, when a user performs a gesture, this set of weights may be employed in the calculation process to enhance recognition performance.

A basic set of gestures may therefore be realized using this trained set of weights. In addition, the custom gesture collection and recognition system having a machine learning accelerator 100 may allow a user to have customized gestures. A user's personal gesture may be recorded and then sent to the Cloud ML server (e.g. the cloud server 388) via an external host processor (e.g. the first micro controller unit 180) or an external device being capable of connecting to Internet for subsequent gesture training. The external host processor (e.g. the first micro controller unit 180) and the external device being capable of connecting to Internet may run a customized gesture collection application program and may be connected to the Cloud server via an internet network through wire or wirelessly. The results of training (e.g. the updated weight Wu) may then be downloaded so the user's own gesture may be used as well.

As mentioned above, signals used for gesture sensing may have frequency in the 60 GHz range. Due to its corresponding millimeter wavelength, the proposed system may detect minute hand/finger movement with millimeter accuracy. Special processing of phase information for radar signal may be required. A special phase processing engine (e.g. the phase extractor 120) in the FIGURE may be used for such purpose.

In summary, by means of the gesture recognition system provided by the embodiment, an anti jamming and collision avoidance system may be implemented. The accuracy and correctness of gesture recognition may be improved by means of machine learning. It is also allowed to set customized gestures for a user and the customized gestures can be also trained in a server for better user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A custom gesture collection and recognition system having a machine learning accelerator, comprising:
   a transmission unit, having a self-interference cancellation engine, configured to transmit a transmission signal to detect a gesture;
   a first reception chain, configured to receive a first signal and generate first feature map data corresponding to the first signal, wherein the first signal is generated by the gesture reflecting the transmission signal;
   a second reception chain, configured to receive a second signal and generate second feature map data corresponding to the second signal, wherein the second signal is generated by the gesture reflecting the transmission signal;
   a third reception chain, configured to receive a third signal and generate third feature map data corresponding to the third signal, wherein the third signal is generated by the gesture reflecting the transmission signal;
   a customized gesture collection engine, configured to generate gesture data according to at least the first feature map data, the second feature map data, and the third feature map data, and comprising:
      a first terminal, coupled to the first reception chain and configured to receive the first feature map data;
      a second terminal, coupled to the second reception chain and configured to receive the second feature map data;
      a third terminal, coupled to the third reception chain and configured to receive the third feature map data; and
      an output terminal, configured to output the gesture data corresponding to at least the first feature map data, the second feature map data, and the third feature map data; and
   a machine learning accelerator configured to perform machine learning with the gesture data, the machine learning accelerator comprising an input terminal coupled to the output terminal of the customized gesture collection engine and configured to receive the gesture data;
   wherein the first signal, the second signal, and the third signal are inputted to the self-interference cancellation engine.

2. The custom gesture collection and recognition system having a machine learning accelerator of claim 1, wherein:
   the first reception chain comprises:
      a first antenna, configured to receive the first signal;
      a first receiver, comprising a first terminal coupled to the first antenna and configured to receive the first signal, and an output terminal configured to output the first signal;
      a first signal processing engine, configured to generate first processed data according to the first signal, and comprising:
         an input terminal, coupled to the output terminal of the first receiver and configured to receive the first signal; and
         an output terminal, configured to output the first processed data; and
      a first feature map generator, configured to generate the first feature map data according to the first processed data, and comprising:
         an input terminal, coupled to the output terminal of the first signal processing engine and configured to receive the first processed data; and
         an output terminal, configured to output the first feature map data;
   the second reception chain comprises:
      a second antenna, configured to receive the second signal;
      a second receiver, comprising:
         a first terminal, coupled to the second antenna and configured to receive the second signal; and
         an output terminal, configured to output the second signal;
      a second signal processing engine, configured to generate second processed data according to the second signal, and comprising:
         an input terminal, coupled to the output terminal of the second receiver and configured to receive the second signal; and
         an output terminal, configured to output the second processed data; and
      a second feature map generator, configured to generate the second feature map data according to the second processed data, and comprising:
         an input terminal, coupled to the output terminal of the second signal processing engine and configured to receive the second processed data; and
         an output terminal, configured to output the second feature map data; and the third reception chain comprises:
  a third antenna, configured to receive the third signal;
  a third receiver, comprising:
    a third terminal, coupled to the third antenna and configured to receive the third signal; and
    an output terminal, configured to output the third signal;
  a third signal processing engine, configured to generate third processed data according to the third signal, and comprising:
    an input terminal, coupled to the output terminal of the third receiver and configured to receive the third signal; and
    an output terminal, configured to output the third processed data; and
  a third feature map generator, configured to generate the third feature map data according to the third processed data, and comprising:
    an input terminal, coupled to the output terminal of the third signal processing engine and configured to receive the third processed data; and
    an output terminal, configured to output the third feature map data.

3. The custom gesture collection and recognition system having a machine learning accelerator of claim 2, further comprising:
  a frequency synthesizer configured to provide a reference oscillation signal;
  wherein:
  the transmission unit comprises an input terminal;
  the first receiver further comprises a second terminal;
  the second receiver further comprises a second terminal;
  the third receiver further comprises a second terminal;
  the frequency synthesizer comprises:
    a first terminal, coupled to the second terminal of the first receiver for outputting the reference oscillation signal to the first receiver;
    a second terminal, coupled to the second terminal of the second receiver for outputting the reference oscillation signal to the second receiver;
    a third terminal, coupled to the input terminal of the transmission unit for outputting the reference oscillation signal to the transmission unit; and
    a fourth terminal, coupled to the second terminal of the third receiver for outputting the reference oscillation signal to the third receiver;
  wherein the transmission unit adjusts the transmission signal according to the reference oscillation signal, the first reception chain adjusts the first signal according to the reference oscillation signal, the second reception chain adjusts the second signal according to the reference oscillation signal, and the third reception chain adjusts the third signal according to the reference oscillation signal.

4. The custom gesture collection and recognition system having a machine learning accelerator of claim 3, wherein the frequency synthesizer further comprises:
  a Sigma-Delta modulator waveform generator, configured to modulate a waveform and the reference oscillation signal; and
  an event synthesizer, configured to enhance resolution of the waveform.

5. The custom gesture collection and recognition system having a machine learning accelerator of claim 2, further comprising:
  a phase extractor, configured to analyze phases of the first signal, the second signal, and the third signal according to the first feature map data, the second feature map data, and the third feature map data, and comprising:
    a first terminal, coupled to the output terminal of the first feature map generator;
    a second terminal, coupled to the output terminal of the second feature map generator; and
    a third terminal, configured to the output terminal of the third feature map generator.

6. The custom gesture collection and recognition system having a machine learning accelerator of claim 1, wherein the machine learning accelerator further comprises:
  a weight modulating engine, configured to store a weight;
  an array processor, connected to the weight modulating engine and configured to receive the weight and the gesture data, and recognize the gesture using a recognition algorithm according to the weight and the gesture data; and
  a machine learning hardware acceleration scheduler, connected to the weight modulating engine and storing the weight.

7. The custom gesture collection and recognition system having a machine learning accelerator of claim 6, wherein the machine learning hardware acceleration scheduler comprises:
  a direct memory access controller;
  a micro controller unit, controlling the weight modulating engine and the array processor via the direct memory access controller;
  a memory, storing array data of the array processor; and
  a softmax activation function module, configured to output the array data of the array processor.

8. The custom gesture collection and recognition system having a machine learning accelerator of claim 6, wherein the gesture data is transmitted to a cloud server to be trained by the cloud server for generating an updated weight, and the updated weight is transmitted to the machine learning hardware acceleration scheduler to update the weight.

9. The custom gesture collection and recognition system having a machine learning accelerator of claim 8, further comprising:
  an external host, connected to the machine learning hardware acceleration scheduler, the customized gesture collection engine, and the cloud server, and configured to receive the updated weight from the cloud server.

10. The custom gesture collection and recognition system having a machine learning accelerator of claim 1, further comprising:
  a three dimensional coordinate trace engine, connected to the output terminal of the customized gesture collection engine to transform a space coordinate for the first feature map data, the second feature map data, and the third feature map data.

11. The custom gesture collection and recognition system having a machine learning accelerator of claim 1, applied to a human machine interface, an intelligent device, a wearable device, or a Chinese font inputting device.

12. The custom gesture collection and recognition system having a machine learning accelerator of claim 1, applied to an inputted command of a game.

13. The custom gesture collection and recognition system having a machine learning accelerator of claim 12, wherein the game includes an exercise game and an interaction game.

14. The custom gesture collection and recognition system having a machine learning accelerator of claim 11, wherein the wearable device includes a true wireless stereo.

15. The custom gesture collection and recognition system having a machine learning accelerator of claim 14, wherein the true wireless stereo includes an earphone and an ear bar.

\* \* \* \* \*